(12) United States Patent
Suzuki et al.

(10) Patent No.: US 10,318,071 B2
(45) Date of Patent: Jun. 11, 2019

(54) METHOD AND APPARATUS FOR A BLOB ANGLE ORIENTATION RECOGNITION IN A TOUCH DEVICE

(71) Applicant: Intel Corporation, Santa Clara, CA (US)

(72) Inventors: Nobuyuki Suzuki, Portland, OR (US); Dale Bengtson, Portland, OR (US); Vijay Venkatesh Mahalingam, San Jose, CA (US); Lee Nau, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 67 days.

(21) Appl. No.: 15/467,799

(22) Filed: Mar. 23, 2017

(65) Prior Publication Data

US 2018/0275822 A1    Sep. 27, 2018

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC ........ G06F 3/044; G06F 3/041; G06F 3/0412; G06F 3/0416; G06F 3/0418
See application file for complete search history.

(56) References Cited

U.S. PATENT DOCUMENTS

| | | | | |
|---|---|---|---|---|
| 6,329,246 B1* | 12/2001 | Lee | .................. | H01L 29/66825 257/E21.422 |
| 8,593,418 B2* | 11/2013 | Blow | .................... | G06F 1/1626 345/156 |
| 8,604,364 B2* | 12/2013 | Simon | ................. | G06F 3/03547 178/18.03 |
| 8,773,396 B1* | 7/2014 | Ksondzyk | .............. | G06F 3/044 345/174 |
| 9,262,012 B2* | 2/2016 | Hwang | .................... | G06F 3/042 |
| 9,965,090 B2* | 5/2018 | Funston | ................ | G06F 3/0416 |
| 2007/0097096 A1* | 5/2007 | Rosenberg | ............ | G06F 1/1626 345/173 |
| 2009/0122022 A1* | 5/2009 | Park | ...................... | G06F 3/0488 345/173 |
| 2010/0321316 A1* | 12/2010 | Homma | ................ | G06F 3/0235 345/173 |
| 2011/0018827 A1* | 1/2011 | Wang | .................... | G06F 3/0482 345/173 |
| 2011/0074694 A1* | 3/2011 | Rapp | ................... | G06F 3/04845 345/173 |
| 2011/0179387 A1* | 7/2011 | Shaffer | ............... | G06F 3/04883 715/835 |
| 2011/0234522 A1* | 9/2011 | Lin | ..................... | G06F 3/04883 345/173 |

(Continued)

*Primary Examiner* — Kenneth Bukowski
(74) *Attorney, Agent, or Firm* — Womble Bond Dickinson (US) LLP

(57) ABSTRACT

A method and apparatus for generating touch blob angle orientation in a touch device are described. In one embodiment, the apparatus comprises a touch processing unit operable to analyze sensor data generated from touch inputs on a touchscreen and generate touch blob information for each detected touch blob; and a filter coupled to the touch processing unit operable to filter blob orientation information from a filter output in response to detection of a finger lifting event.

25 Claims, 7 Drawing Sheets

(56) References Cited

U.S. PATENT DOCUMENTS

| | | | |
|---|---|---|---|
| 2012/0206377 A1* | 8/2012 | Zhao | G06F 3/041 345/173 |
| 2013/0176247 A1* | 7/2013 | Jogo | G06F 3/041 345/173 |
| 2013/0176274 A1* | 7/2013 | Sobel | G06F 3/0416 345/174 |
| 2013/0321268 A1* | 12/2013 | Tuck | G06F 3/041 345/157 |
| 2014/0002407 A1* | 1/2014 | Badaye | G06F 3/0416 345/174 |
| 2015/0363585 A1* | 12/2015 | Gooding | G06F 21/32 726/19 |
| 2016/0209980 A1* | 7/2016 | Funston | G06F 3/0416 |
| 2017/0068337 A1* | 3/2017 | Bhandari | G06F 3/044 |

* cited by examiner

METHOD AND APPARATUS FOR A BLOB ANGLE ORIENTATION RECOGNITION IN A TOUCH DEVICE

FIELD OF THE INVENTION

Embodiments of the present invention relate to the field of computing devices; more particularly, embodiments of the present invention relate to computing devices with touch devices that are able to recognize and output blob angle orientation using a touch processing subsystem.

BACKGROUND OF THE INVENTION

Touch devices may provide users with an intuitive way of interacting with electronic devices through touch. These could include touchscreens that include touch processing subsystems to receive and/or touch inputs. Currently, a number of consumer electronic devices such as, for example, telephone mobile devices, tablet computers, laptop computers, and televisions are adapted to include touch processing subsystems.

The user may perform gestures by making contact on the touch devices with his finger or fingers or an object such as a stylus. These gestures may allow the user to control the functions of the electronic device.

Recently, the touch sensor of touch devices are able to generate signals that result from a finger being depressed on the touchscreen, which are converted into an image. This image is commonly referred to as a blob image. Often the blob image is elliptical in shape. Some touch processing systems also determine the orientation of the blob image. A problem arises when a person lifts their finger from the touchscreen surface. This is referred to herein as a finger lift event. During such finger lift events, when the finger lifts and releases from the touch sensor, there is an unexpected jitter on the orientation angle. Therefore, the orientation angle that output by the touch processing system, and any subsequent processing using such data, could be wrong.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed to suppress the orientation jitter associated with a touch blob during the touch blob release from a touchscreen of an elective device (e.g., mobile phone, computer system, etc.). In one embodiment, the touch sensor density of the touchscreen identifies the noble features, including the position, and size and orientation of a touch device. In one embodiment, with the increasing amount of the sensor nodes and using a control processing unit (CPU), Graphics Processing Unit (GPU), or some other embedded microcontroller unit (MCU) in the system as part of the touch sensor image processing, the touch subsystem can recognize the shape of the blob and can analyze the orientation of the blob. The obtained orientation is used for a user interaction (UI), and enables the unique UI such as, for example, a rotation gesture and finger identification. More specifically, by determining the orientation of the blob associated with the finger touch, the attached processing subsystem can determine if the user made a rotation with respect to the finger. By identifying rotation of the finger, the user is able to perform orientation-based control of the electronic device. That is, by determining the amount of rotation, for a UI event, an orientation-based user experience may be obtained. The technique disclosed herein are used to suppress the blob orientation jitter during the touch blob release from the touch sensor, thereby providing more reliable and higher quality touch system.

Note that the following disclosure will be described in terms of a finger touch and lift events. However, other touch events that aren't made with a finger yet create blob or similarly shaped (e.g., elliptical) images having orientations are also applicable.

Figure 1:
FIG. 1 illustrates an example of a mobile device according to one embodiment.

FIG. 1 illustrates an example of a consumer electronic device in which an embodiment of the invention may be implemented. As shown in FIG. 1, electronic device 10 may be a mobile telephone communications device (or mobile device) or a smartphone. In other embodiments, the electronic device 10 comprises a laptop computer system, tablet, personal digital assistant (PDA), etc. The device 10 in FIG. 1 may include a housing that includes a touch screen 16 on the front face of the device 10.

Figure 2:
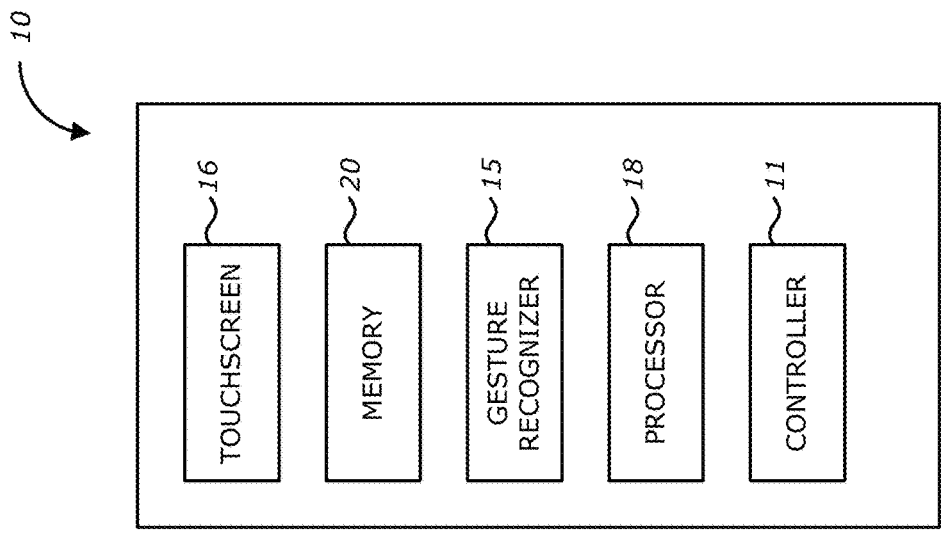
FIG. 2 illustrates a block diagram of a system to recognize touch events according to an embodiment.

FIG. 2 illustrates a block diagram of a system to control operations by interacting with a display screen 16 using gestures such as finger rotation or twist according to an embodiment. As shown in FIG. 2, the system may be included in the device 10 and may include a touch screen 16, a processor 18, a memory 20, a gesture recognizer 15, and a first controller 11.

Touch screen 16 receives the user's input gestures to control or interact with the device 10. For example, touch screen 16 may include a touchscreen display that acts as a graphical user interface. Examples of user's input gestures to the touchscreen display include a finger rotation gesture. A user performs a gesture using one or more fingers or objects. The touchscreen display may include a number of sensors to detect user interaction with the touchscreen and generate a set of sensor data in response to the user interaction. The sensors may include touch sensors to detect the location at which the user makes contact with the touchscreen display with one's finger, fingers or object and the touch points associated with the user's content.

Controller 11 may be coupled to processor 18 and to touchscreen 16. Controller 11 may be a touch controller that receives the sensor data from touchscreen 16 and generate location and orientation data for a blob from the sensor data.

Figure 3:
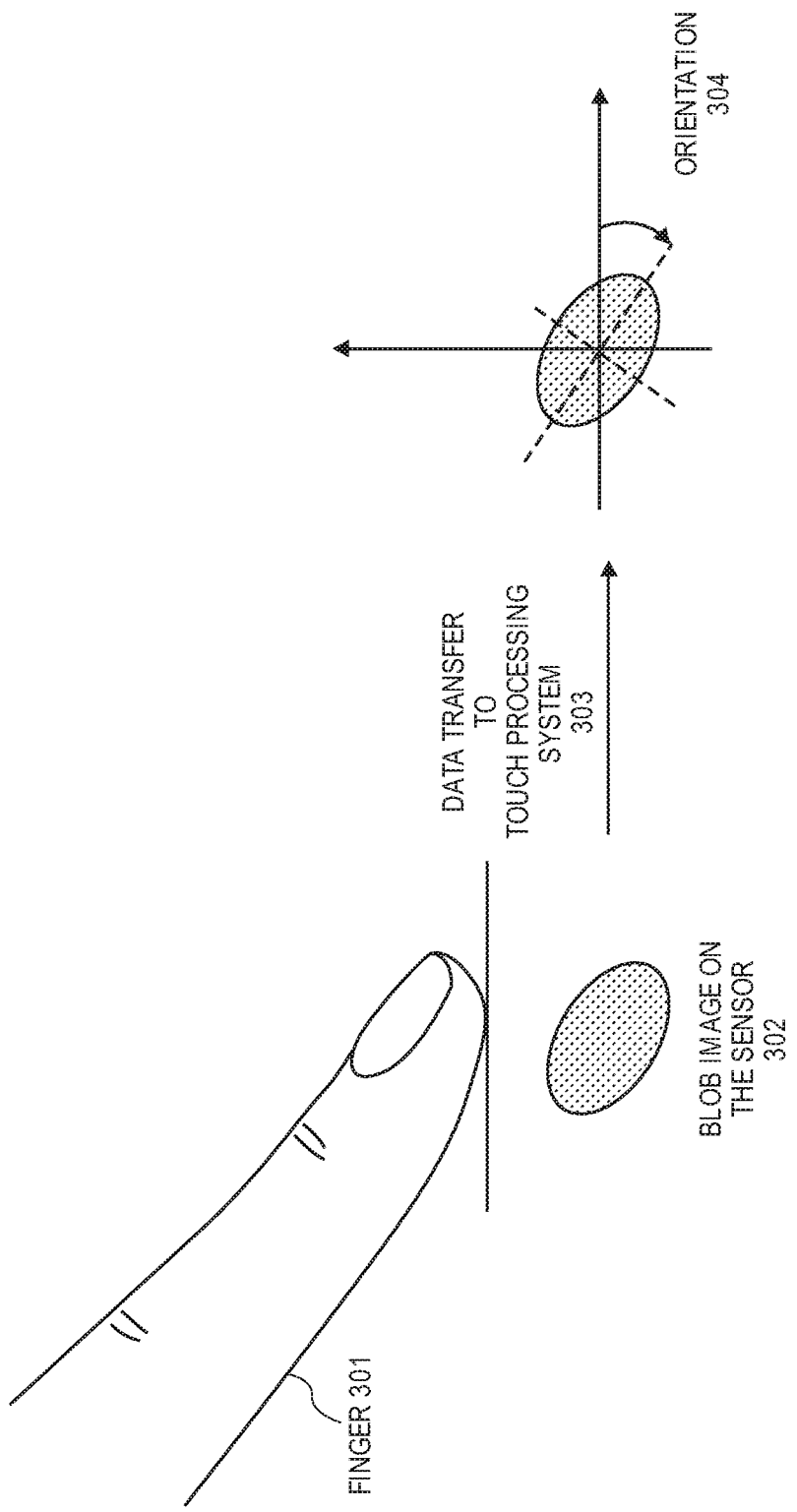
FIG. 3 illustrates a blob image being created on a touch sensor and its associated orientation angle.

FIG. 3 illustrates a blob image being created on a touch sensor and its associated orientation angle. Referring to FIG. 3, finger 301 touches the touch sensor and creates blob image 302 on the sensor. In one embodiment, data 303 associated with the signals from blob image 302 on the touch sensor are transferred to the touch processing system where orientation 304 of blob image 302 (along with position and size) is determined. In one embodiment, orientation 304 has an orientation angle that is calculated from data 303 that is transferred to the touch processing system. For example, blob image 302 is in the shape of an ellipse and the touch processing system examines the angle of the ellipse to determine the angle of orientation. In one embodiment, the orientation angle is determined by physical moments calculations.

Figure 4:
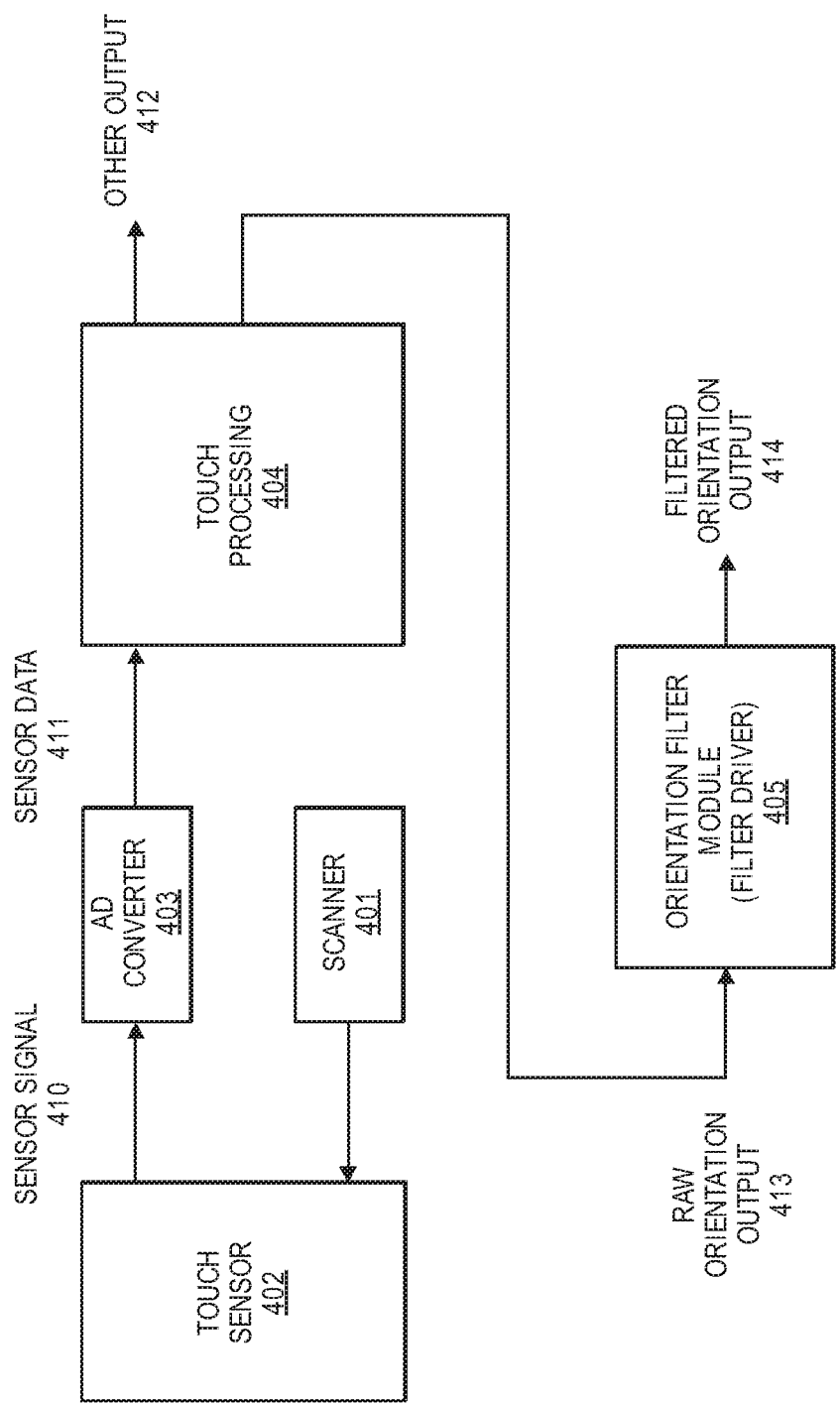
FIG. 4 is a block diagram of one embodiment of a touch subsystem architecture.

FIG. 4 is a block diagram of one embodiment of a touch subsystem architecture. In one embodiment, the touchscreen includes touch sensors with the increased spatial density of 2× or more and more granularity than other prior art touchscreen, which provides more information for each touch event. Referring to FIG. 4, touch sensor 402 is periodically stimulated by scanner 401 in a manner well-known in the art and the corresponding sensing signal 410 is acquired by Analog-Digital (AD) convertor 403 as the sensor data 411. In one embodiment, sensor data 411 comprises a 2D image of touch points. In one embodiment, the 2D image of touch points comprises a heat map. Touch processing unit 404 analyzes, segments, classifies and processes sensor data 411 to acquire the touch blob properties. In one embodiment, the touch blob properties comprise the position and the size of each blob, with its index, and the orientation of the blob. Note the indexes represent identifiers to identify separate instances of touch events (e.g., two separate touch events on the touchscreen occurring at the same time) that occur to touch sensor 402 and are used to track the separate touch events in the touch processing subsystem. In one embodiment, touch processing unit 404 calculates the shape of the touch blob in response to the touch object image. Touch processing 404 may determine the touch blob has an elliptical shape and make an estimation of the orientation angle with respect to the ellipse of the touch blob.

In one embodiment, by looking at the 2D image of the touch points and using spatial moments, touch processing blob can compute where the ellipse is pointing and then compute the orientation of the blob based on where the touch blob is pointing. In one embodiment, touch processing unit 404 uses a processor, a graphics processing unit (GPU) in a processor or some other embedded MCU to perform part of the touch processing such as, for example, estimating the orientation angle of the touch blob. In one embodiment, touch processing unit 404 may determine the touch blob orientation by the history of the touch blob motion.

The touch processing 404 generates output 412 as well as raw orientation output data 413. In one embodiment, output 412 comprises the touch blob properties of location and size as well as data associated with other touch events. Output 412 may include index information to identify individual touch events. Raw orientation output 413 goes to orientation determination module 405 which generates filter orientation output 414. In one embodiment, orientation filter module 405 comprises circuitry to enable generation of filtered output 414. In one embodiment, orientation filter module 405 comprises an orientation filter driver as is described below, which receives the obtained blob orientation from touch processing unit 404 as an input (denoted as raw orientation output 413) and provides the filtered orientation data as an output (denoted as filtered orientation output 414).

Figure 5:
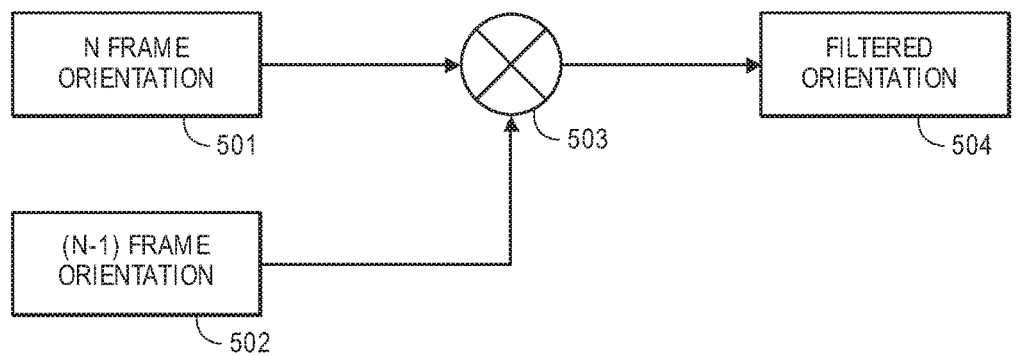
FIG. 5 is a block diagram of one embodiment of an orientation filter driver architecture.

FIG. 5 is a block diagram of one embodiment of an orientation filter driver architecture. Referring to FIG. 5, the orientation filter driver is a finite impulse response filter that takes the raw orientation data 501 of current frame N and orientation data 502 of the previous frame N+1, and provides the filtered orientation data 504 as the output.

Figure 6:
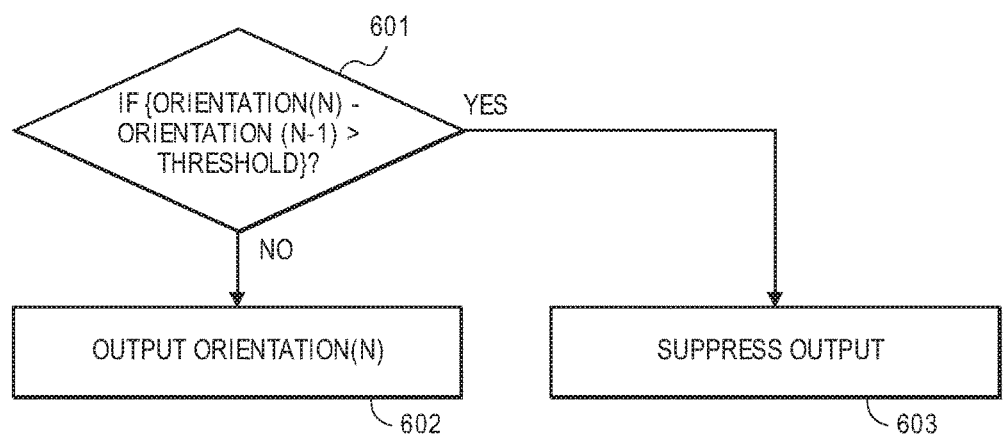
FIG. 6 illustrates one embodiment of an orientation filter driver algorithm.

FIG. 6 illustrates one embodiment of an orientation filter driver algorithm. Referring to FIG. 6, the orientation filter driver subtracts the previous orientation data (Orientation (N−1) from the orientation data of the previous frame N−1 (Orientation (N)) and then determines whether the result is greater than a threshold (processing block 601). If the result is greater than the threshold, the filter suppresses the output (processing block 603), which means the orientation data is not output from the touch subsystems; otherwise, the filter outputs the current orientation data (Orientation (N)) (processing block 602).

Figure 7:
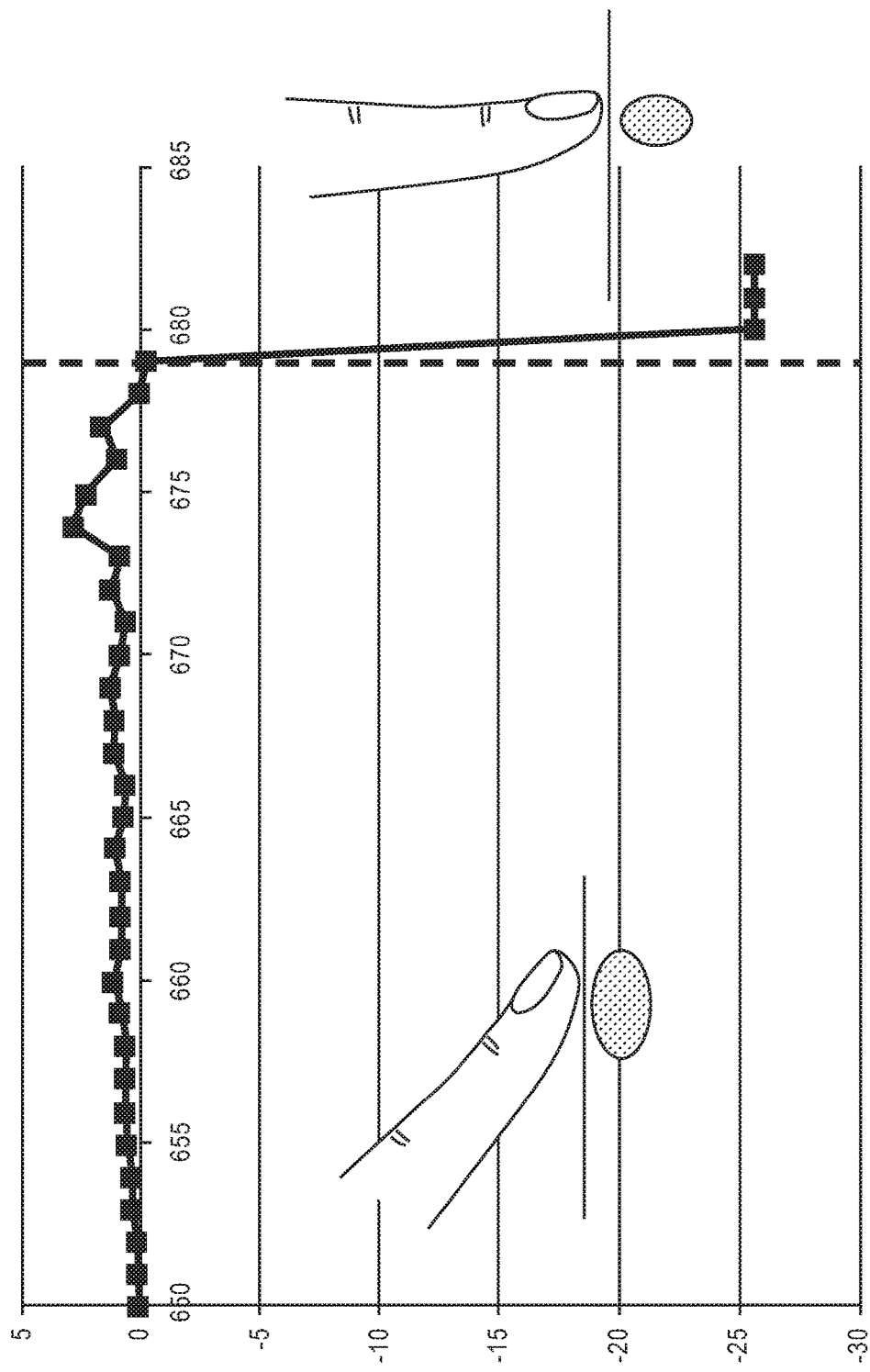
FIG. 7 illustrates operation of one embodiment of the subsystem works.

FIG. 7 illustrates how one embodiment of the subsystem works. Referring to FIG. 7, the chart shows the subtraction of the orientation filter driver in FIG. 6 over the time, x axis represents the normalized time and y axis shows the subtraction result. When a finger is landing the surface of the touch sensor and sensed, the blob is observed as an ellipse, whose long axis is lying along the finger direction. When the finger is being release from the sensor (i.e., a finger lift event is occurring), it is gradually standing up. This process changes the blob ellipse direction dramatically and the long axis of the ellipse is quickly turning, resulting a big change of the subtraction output.

The amount of the orientation is significant from the regular blob movement, e.g. the finger twist. The speed of the finger twist is maximum 90 deg/sec. If the touch sensor data acquisition frequency is 100 Hz, the subtraction is being around 1 deg. While the orientation change during the finger release is obvious and the subtraction becomes significantly bigger than 1 degree. Therefore, the event of the blob release can be easily signified by a constant threshold from the regular blob orientation movement.

Because the finger lifting event causes jitter to be added into the orientation determination process, the touch processing subsystem is prevented from outputting touch blob orientation information during those times when a finger lift event has been identified.

Figure 8:
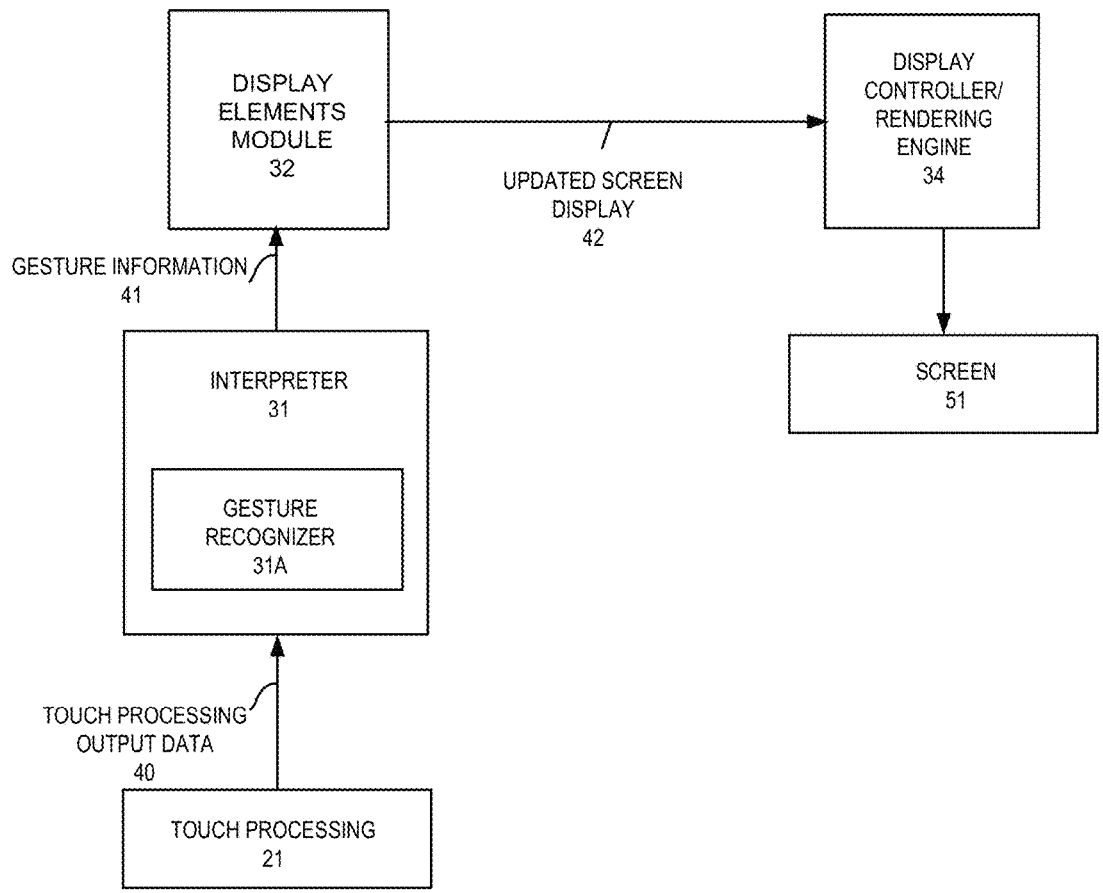
FIG. 8 is a data flow diagram of one embodiment of the process of managing the display on an electronic device in response to a user gesture involving rotation of an individual's finger.

FIG. 8 is a data flow diagram of one embodiment of the process of managing the display on an electronic device using a gesture. In one embodiment, the process is performed by processing logic that may comprise hardware (circuitry, dedicated logic, etc.), software (such as is run on a general purpose computer system or a dedicated machine), firmware, or a combination of the three.

Referring to FIG. 8, touch processing 21 generates touch processing output data 40 in response to user interaction with the touchscreen display. Interpreter 31 receives touch processing output data 40 and interprets touch processing output data 40 to determine if touch processing output data 40 is indicative of an action. Gesture recognizer 31A, which may or may not be part of interpreter 31, performs gesture recognition on touch processing output data 40 and generates gesture information 41. In one embodiment, gesture information 41 specifies one or more gestures made by a user interacting with the screen and where the gesture was made on the display (e.g., location information). In one embodiment, the gesture is the twisting or rotation of a finger. If the recognized gesture is for managing display elements, then display elements module 32 receives the gesture information 41 and access memory to determine which display elements were implicated by the gesture. For example, if the gesture was a finger twisting made on an image, display elements module 32 determines which image was displayed at that location and sends new display information 42 that shows the image being rotated to display controller/rendering engine 34 that displays image on the touchscreen 51.

Figure 9:
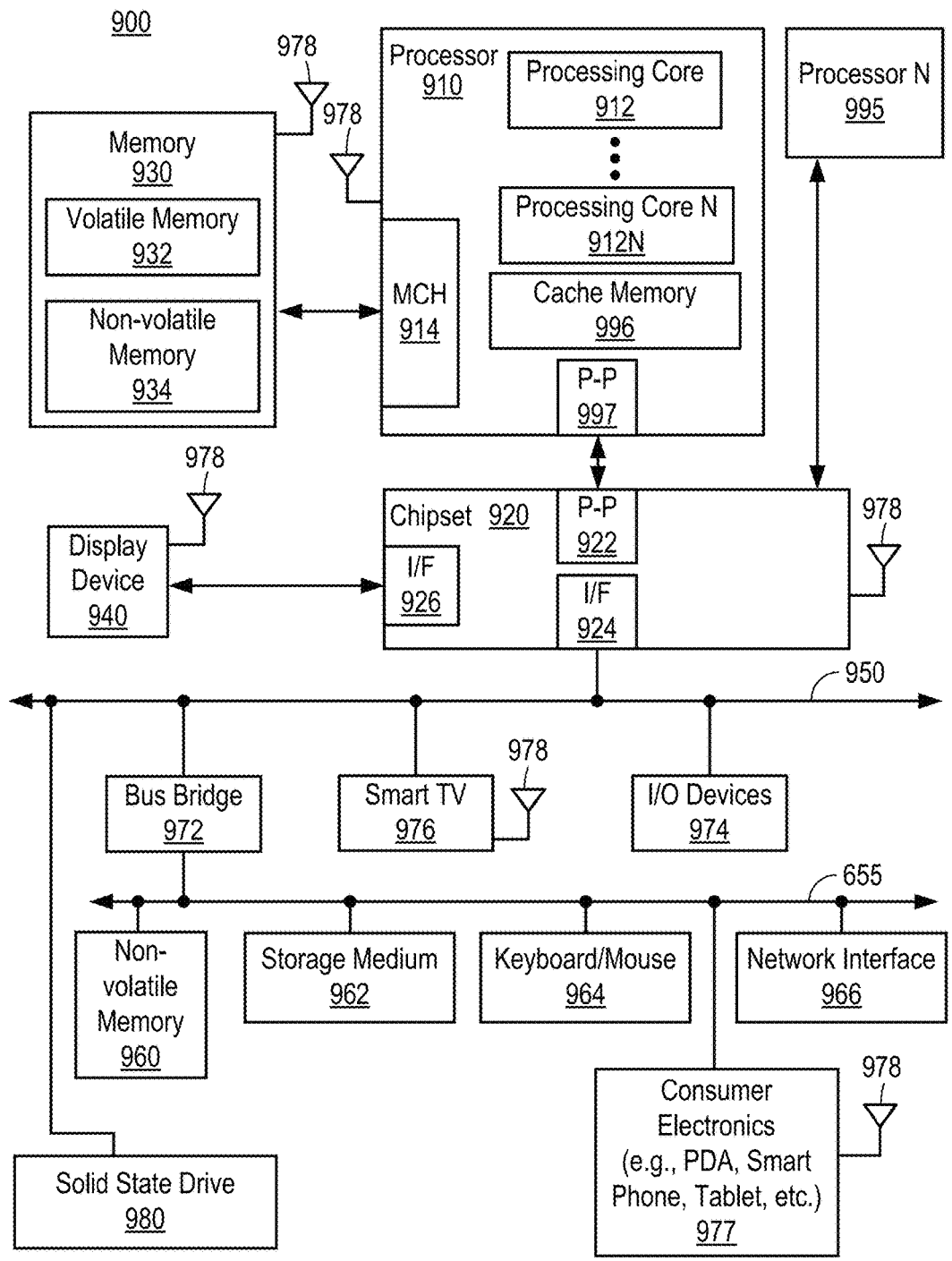
FIG. 9 is a block diagram of one embodiment of a system.

FIG. 9 is one embodiment of a system level diagram 900 that may incorporate the techniques described above. For example, the techniques described above may be incorporated into an interconnect or interface in system 900.

Referring to FIG. 9, system 900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 900 implements the methods disclosed herein and may be a system on a chip (SOC) system.

In one embodiment, processor 910 (e.g., processing device 101 of FIG. 1) has one or more processor cores 912 to 912N, where 912N represents the Nth processor core inside the processor 910 where N is a positive integer. In one embodiment, system 900 includes multiple processors including processors 910 and 905, where processor 905 has logic similar or identical to logic of processor 910. In one embodiment, system 900 includes multiple processors including processors 910 and 905 such that processor 905 has logic that is completely independent from the logic of processor 910. In such an embodiment, a multi-package system 900 is a heterogeneous multi-package system because the processors 905 and 910 have different logic units. In one embodiment, processing core 912 includes, but is not limited to, pre-fetch logic to fetch instructions, decode logic to decode the instructions, execution logic to execute instructions and the like. In one embodiment, processor 910 has a cache memory 916 to cache instructions and/or data of the system 900. In another embodiment of the invention, cache memory 916 includes level one, level two and level three, cache memory, or any other configuration of the cache memory within processor 910.

In one embodiment, processor 910 includes a memory control hub (MCH) 914, which is operable to perform functions that enable processor 910 to access and communicate with a memory 930 that includes a volatile memory 932 and/or a non-volatile memory 934. In one embodiment, memory control hub (MCH) 914 is positioned outside of processor 910 as an independent integrated circuit.

In one embodiment, processor 910 is operable to communicate with memory 930 and a chipset 920. In such an embodiment, SSD 980 executes the computer-executable instructions when SSD 980 is powered up.

In one embodiment, processor 910 is also coupled to a wireless antenna 978 to communicate with any device configured to transmit and/or receive wireless signals. In one embodiment, wireless antenna interface 978 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory (e.g., NAND, NOR), phase change memory (PCM), read-only memory (ROM), electrically erasable programmable read-only memory (EEPROM), or any other type of non-volatile memory device.

Memory 930 stores information and instructions to be executed by processor 910. In one embodiment, chipset 920 connects with processor 910 via Point-to-Point (PtP or P-P) interfaces 917 and 922. In one embodiment, chipset 920 enables processor 910 to connect to other modules in the system 900. In one embodiment, interfaces 917 and 922 operate in accordance with a PtP communication protocol such as the Intel QuickPath Interconnect (QPI) or the like.

In one embodiment, chipset 920 is operable to communicate with processor 910, 905, display device 940, and other devices 972, 976, 974, 960, 962, 964, 966, 977, etc. In one embodiment, chipset 920 is also coupled to a wireless antenna 978 to communicate with any device configured to transmit and/or receive wireless signals. In one embodiment, display device 940 is a touchscreen display has a surface that recognizes the presence of one or more points of contact with the surface (e.g., finger touch events).

In one embodiment, the touchscreen display is a capacitive touchscreen that is used to recognize a user's touch, but in alternative embodiments, other types of touchscreen display may be used. In such a capacitive system, a layer that stores electrical charge is placed on the glass panel of the monitor. When a user touches the monitor, charge is transferred to the user, thereby decreasing the charge on the capacitive layer. This decrease is measured using circuitry located at each corner of the screen. The system (e.g., electronic device) calculates, from the relative differences in charge at each corner, where the touch event took place and then relays that information to the touch-screen driver software.

Once the coordinates of the touch events are known, a recognition engine (e.g., software, hardware, firmware and/or a combination of all three) converts the user's touch into something that the operating system and/or applications running on the system can understand. That is, the touch events may be recognized as a gesture when a user places one or more fingers on the touchscreen display, and the gesture recognizer interprets the pattern of touch events as a particular gesture. To detect a gesture, touch events have to be collected and then interpreted to determine whether the touch data even meets criteria for any gesture that the system, or some application running in the system, recognizes. The gesture starts when the user first touches the screen, continues as the system tracks the position of the user's finger(s), and ends by capturing the final event of the user's fingers leaving the screen.

For each sequence of touch events on a touchscreen (e.g., position, pressure, size, addition of another finger, etc.), the data associated with the touch events is compared to stored data classified as individual gestures. If the data matches the stored data (or is within some tolerance), the touch events are determined to be a gesture. The application can use this data to determine if the identified gesture is relevant to its operation.

Referring back to FIG. 9, in one embodiment, chipset 920 connects to a display device 940 via an interface 926. In one embodiment, display device 940 includes, but is not limited to, liquid crystal display (LCD), plasma, cathode ray tube (CRT) display, or any other form of visual display device.

In addition, chipset 920 connects to one or more buses 950 and 955 that interconnect various modules 974, 960, 962, 964, and 966. In one embodiment, buses 950 and 955 may be interconnected together via a bus bridge 972 if there is a mismatch in bus speed or communication protocol. In one embodiment, chipset 920 couples with, but is not limited to, a non-volatile memory 960, a mass storage device(s) 962, a keyboard/mouse 964, and a network interface 966 via interface 924, smart TV 976, consumer electronics 977, etc.

In one embodiment, mass storage device 962 includes, but is not limited to, a solid state drive, a hard disk drive, a universal serial bus flash memory drive, or any other form of computer data storage medium. In one embodiment, network interface 966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 9 are depicted as separate blocks within the system 900, the functions performed by some of these blocks may be integrated within a single semiconductor circuit or may be implemented using two or more separate integrated circuits.

There are a number of example embodiments described herein.

Example 1 is an apparatus for processing data corresponding to signals generated by a touch sensor system of a touch device, the apparatus comprising: a touch processing unit operable to analyze sensor data generated from touch inputs on a touchscreen and generate touch blob information for each detected touch blob; and a filter coupled to the touch processing unit operable to filter blob orientation information from a filter output in response to detection of a finger lifting event.

Example 2 is the apparatus of example 1 that may optionally include that the filter is operable to output the blob orientation information for a current frame at the filter output in response to blob orientation data for the current frame and blob orientation data for the frame immediately preceding the current frame.

Example 3 is the apparatus of example 2 that may optionally include that the filter is operable to suppress output of the blob orientation information during the finger lifting event that produces a touch blob release from the touch sensor.

Example 4 is the apparatus of example 2 that may optionally include that the filter is operable to: determine whether a difference between the blob orientation for a touch blob in the current frame and the blob orientation for the touch blob in the immediately preceding frame is greater than a threshold; output the blob orientation information of the current frame if the difference between the blob orientation for a touch blob in the current frame and the blob orientation for a touch blob in the immediately preceding frame is greater than a threshold; and suppress the blob orientation information of the current frame from the filter output if the difference between an orientation for a current frame and the orientation of the immediately preceding frame is not greater than the threshold.

Example 5 is the apparatus of example 1 that may optionally include that the filter is operable to determine that a finger lift event has occurred resulting in a blob release based on a relationship between differences between blob orientation data of successive frames and a threshold.

Example 6 is the apparatus of example 5 that may optionally include that the relationship is that a difference between blob orientation for a touch blob for a current frame and an immediately preceding frame is greater than the threshold.

Example 7 is the apparatus of example 1 that may optionally include that the filter comprises a finite impulse response filter.

Example 8 is the apparatus of example 1 that may optionally include that the sensor data comprises a heat map.

Example 9 is the apparatus of example 1 that may optionally include that the touch blob information comprises touch blob position information, touch blob size information, and touch blob orientation of the touch blob.

Example 10 is a computing system comprising: a touchscreen having a touch sensor; analog-to-digital converter (ADC) coupled to the touch sensor and operable to generate sensor data in response to a sensor signal from the touch sensor; a touch processing unit operable to analyze the sensor data generated from touch inputs on a touchscreen and generate touch blob information for each detected touch blob; and a filter coupled to the touch processing unit operable to filter blob orientation information from a filter output in response to detection of a finger lifting event.

Example 11 is the computing system of example 10 that may optionally include that the filter is operable to output the blob orientation information for a current frame at the filter output in response to blob orientation data for the current frame and blob orientation data for the frame immediately preceding the current frame.

Example 12 is the computing system of example 11 that may optionally include that the filter is operable to suppress output of the blob orientation information during the finger lifting event that produces a touch blob release from the touch sensor.

Example 13 is the computing system of example 11 that may optionally include that the filter is operable to: determine whether a difference between the blob orientation for a touch blob in the current frame and the blob orientation for the touch blob in the immediately preceding frame is greater than a threshold; output the blob orientation information of the current frame if the difference between the blob orientation for a touch blob in the current frame and the blob orientation for a touch blob in the immediately preceding frame is greater than a threshold; and suppress the blob orientation information of the current frame from the filter output if the difference between an orientation for a current frame and the orientation of the immediately preceding frame is not greater than the threshold.

Example 14 is the computing system of example 10 that may optionally include that the filter is operable to determine that a finger lift event has occurred resulting in a blob release based on a relationship between differences between blob orientation data of successive frames and a threshold.

Example 15 is the computing system of example 14 that may optionally include that the relationship is that a difference between blob orientation for a touch blob for a current frame and an immediately preceding frame is greater than the threshold.

Example 16 is the computing system of example 10 that may optionally include that the filter comprises a finite impulse response filter.

Example 17 is the computing system of example 10 that may optionally include that the sensor data comprises a heat map.

Example 18 is the computing system of example 10 that may optionally include that the touch blob information comprises touch blob position information, touch blob size information, and touch blob orientation of the touch blob.

Example 19 is the computing system of example 10 that may optionally include that the sensor data comprises a two-dimensional image of the touch points on the touch sensor.

Example 20 is a machine-readable medium having stored thereon one or more instructions, which if performed by a machine causes the machine to perform a method comprising: generating touch blob information for each detected touch blob in sensor data generated from touch inputs on a touchscreen; and filtering blob orientation information from a filter output in response to detection of a finger lifting event.

Example 21 is the machine-readable medium of example 20 that may optionally include that filtering blob orientation information from the filter output comprises outputting the blob orientation information for a current frame at the filter output in response to receiving blob orientation data for the current frame and blob orientation data for the frame immediately preceding the current frame.

Example 22 is the machine-readable medium of example 21 that may optionally include that filtering blob orientation information from the filter output comprises suppressing output of the blob orientation information during the finger lifting event that produces a touch blob release from the touch sensor.

Example 23 is the machine-readable medium of example 21 that may optionally include that filtering blob orientation information from a filter output comprises: determining whether a difference between the blob orientation for a touch blob in the current frame and the blob orientation for the touch blob in the immediately preceding frame is greater than a threshold; outputting the blob orientation information of the current frame if the difference between the blob orientation for a touch blob in the current frame and the blob orientation for a touch blob in the immediately preceding frame is greater than a threshold; and suppressing the blob orientation information of the current frame from the filter output if the difference between an orientation for a current frame and the orientation of the immediately preceding frame is not greater than the threshold.

Example 24 is the machine-readable medium of example 20 that may optionally include that the method further comprises determining that a finger lift event has occurred resulting in a blob release based on a relationship between differences between blob orientation data of successive frames and a threshold.

Example 25 is the machine-readable medium of example 24 that may optionally include that the relationship is that a difference between blob orientation for a touch blob for a current frame and an immediately preceding frame is greater than the threshold.

Example 26 is a processor or other apparatus substantially as described herein.

Example 27 is a processor or other apparatus that is operative to perform any method substantially as described herein.

Example 28 is a processor or other apparatus that is operative to perform any instructions/operations substantially as described herein.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus for processing data corresponding to signals generated by a touch sensor system, the apparatus comprising:
   a touch processing unit operable to analyze sensor data generated from touch inputs on a touchscreen and generate touch blob information for each detected touch blob having blob orientation information indicative of blob orientation, including a blob orientation angle for said each detected touch blob; and
   a filter coupled to the touch processing unit operable to filter the blob orientation information from the touch blob information to generate a filter output in response to detection of a finger lifting event.

2. The apparatus defined in claim 1 wherein the filter is operable to output the blob orientation information for a current frame at the filter output in response to blob orientation data for the current frame and blob orientation data for the frame immediately preceding the current frame.

3. The apparatus defined in claim 2 wherein the filter is operable to suppress output of the blob orientation information during the finger lifting event that produces a touch blob release from the touch sensor.

4. The apparatus defined in claim 2 wherein the filter is operable to:
   determine whether a difference between the blob orientation for a touch blob in the current frame and the blob orientation for the touch blob in the immediately preceding frame is greater than a threshold;
   output the blob orientation information of the current frame when the difference between the blob orientation for a touch blob in the current frame and the blob orientation for a touch blob in the immediately preceding frame is greater than the threshold; and
   suppress the blob orientation information of the current frame from the filter output when the difference between an orientation for a current frame and the orientation of the immediately preceding frame is not greater than the threshold.

5. The apparatus defined in claim 1 wherein the filter is operable to determine that a finger lift event has occurred resulting in a blob release based on a relationship between differences between blob orientation data of successive frames and a threshold.

6. The apparatus defined in claim 5 wherein the relationship is that a difference between blob orientation for a touch blob for a current frame and an immediately preceding frame is greater than the threshold.

7. The apparatus defined in claim 1 wherein the filter comprises a finite impulse response filter.

8. The apparatus defined in claim 1 wherein the sensor data comprises a heat map.

9. The apparatus defined in claim 1 wherein the touch blob information comprises touch blob position information, touch blob size information, and touch blob orientation of the touch blob.

10. A computing system comprising:
    a touchscreen having a touch sensor;
    analog-to-digital converter (ADC) coupled to the touch sensor and operable to generate sensor data in response to a sensor signal from the touch sensor;
    a touch processing unit operable to analyze the sensor data generated from touch inputs on a touchscreen and generate touch blob information for each detected touch blob having blob orientation information indicative of blob orientation, including a blob orientation angle for said each detected touch blob; and
    a filter coupled to the touch processing unit operable to filter the blob orientation information from the touch blob information to generate a filter output in response to detection of a finger lifting event.

11. The system defined in claim 10 wherein the filter is operable to output the blob orientation information for a current frame at the filter output in response to blob orientation data for the current frame and blob orientation data for the frame immediately preceding the current frame.

12. The system defined in claim 11 wherein the filter is operable to suppress output of the blob orientation information during the finger lifting event that produces a touch blob release from the touch sensor.

13. The system defined in claim 11 wherein the filter is operable to:
    determine whether a difference between the blob orientation for a touch blob in the current frame and the blob orientation for the touch blob in the immediately preceding frame is greater than a threshold;
    output the blob orientation information of the current frame when the difference between the blob orientation for a touch blob in the current frame and the blob orientation for a touch blob in the immediately preceding frame is greater than the threshold; and
    suppress the blob orientation information of the current frame from the filter output when the difference between an orientation for a current frame and the orientation of the immediately preceding frame is not greater than the threshold.

14. The system defined in claim 10 wherein the filter is operable to determine that a finger lift event has occurred resulting in a blob release based on a relationship between differences between blob orientation data of successive frames and a threshold.

15. The system defined in claim 14 wherein the relationship is that a difference between blob orientation for a touch blob for a current frame and an immediately preceding frame is greater than the threshold.

16. The system defined in claim 10 wherein the filter comprises a finite impulse response filter.

17. The system defined in claim 10 wherein the sensor data comprises a heat map.

18. The system defined in claim 10 wherein the touch blob information comprises touch blob position information, touch blob size information, and touch blob orientation of the touch blob.

19. The system defined in claim 10 wherein the sensor data comprises a two-dimensional image of the touch points on the touch sensor.

20. A non-transitory machine-readable medium having stored thereon one or more instructions, which if performed by a machine causes the machine to perform a method comprising:
    generating touch blob information for each detected touch blob in sensor data generated from touch inputs on a touchscreen, the touch blob information having blob orientation information indicative of blob orientation, including a blob orientation angle for said each detected touch blob; and
    filtering the blob orientation information from the touch blob information to generate a filter output in response to detection of a finger lifting event.

21. The machine-readable medium defined in claim 20 wherein filtering blob orientation information from the filter output comprises outputting the blob orientation information for a current frame at the filter output in response to receiving blob orientation data for the current frame and blob orientation data for the frame immediately preceding the current frame.

22. The machine-readable medium defined in claim 21 wherein filtering blob orientation information from the filter output comprises suppressing output of the blob orientation information during the finger lifting event that produces a touch blob release from the touch sensor.

23. The machine-readable medium defined in claim 21 wherein filtering blob orientation information from a filter output comprises:
   determining whether a difference between the blob orientation for a touch blob in the current frame and the blob orientation for the touch blob in the immediately preceding frame is greater than a threshold;
   outputting the blob orientation information of the current frame when the difference between the blob orientation for a touch blob in the current frame and the blob orientation for a touch blob in the immediately preceding frame is greater than the threshold; and
   suppressing the blob orientation information of the current frame from the filter output when the difference between an orientation for a current frame and the orientation of the immediately preceding frame is not greater than the threshold.

24. The machine-readable medium defined in claim 20 wherein the method further comprises determining that a finger lift event has occurred resulting in a blob release based on a relationship between differences between blob orientation data of successive frames and a threshold.

25. The machine-readable medium defined in claim 24 wherein the relationship is that a difference between blob orientation for a touch blob for a current frame and an immediately preceding frame is greater than the threshold.

* * * * *